ELECTRONIC RECORDING AND CONTROLLING APPARATUS

Filed Aug. 8, 1949 3 Sheets-Sheet 1

INVENTORS
GEORGE E. BEGGS, JR.
EDWARD W. YETTER
BY
Woodcock and Phelan
ATTORNEYS

ELECTRONIC RECORDING AND CONTROLLING APPARATUS

INVENTORS
GEORGE E. BEGGS, JR.
EDWARD W. YETTER
BY
Woodcock and Phelan
ATTORNEYS

*INVENTORS*
GEORGE E. BEGGS, JR
EDWARD W. YETTER
*BY*
Woodcock and Phelan
ATTORNEYS Patented Feb. 19, 1952

2,586,603

UNITED STATES PATENT OFFICE 2,586,603

ELECTRONIC RECORDING AND CONTROLLING APPARATUS

George E. Beggs, Jr., Warrington, and Edward W. Yetter, Ardmore, Pa., assignors to Leeds and Northrup Company, Philadelphia, Pa., a corporation of Pennsylvania Application August 8, 1949, Serial No. 109,218

6 Claims. (Cl. 318—28)

This invention relates generally to electronic recording and controlling and it relates particularly to high-speed electronic recorders and controllers having high sensitivity for following rapid variations in extremely minute direct currents.

The general problem to which the invention is directed is that of utilizing a small direct-current voltage of the order of a few millionths of a volt to control a servomotor used to drive a recorder pen, or for general control purposes such as opening or closing a valve to control automatically the flow of some material. Experience has shown that A.-C. servomotors are superior to other types for many applications. Thus the problem becomes one of utilizing a very small D.-C. voltage to control an alternative-current motor accurately and dependably.

It has heretofore been recognized that the necessary amplification for such purposes could be accomplished most advantageously by converting the small D.-C. voltage to an A.-C. voltage at the outest, and then amplifying the A.-C. voltage in an A.-C. amplifier, as disclosed in Williams Patent No. 2,113,164. It is well known that A.-C. amplification usually may be accomplished more easily than D.-C. amplifications. However, this arrangement was not wholly satisfactory for the principal reason that, when a high-gain amplifier designed to amplify power-frequency signals was used in order to utilize very weak D.-C. signals, the output voltage of the amplifier included spurious components due to the amplification of energy at the power-line frequency coupled to the input circuits of the amplifier magnetically, electrostatically, or otherwise. These spurious components sometimes caused erratic operation of the motor.

It has heretofore been suggested that the small D.-C. signal might initially be converted to an A.-C. signal at a frequency considerably higher than that of the power supply in order that amplification might be accomplished without interference from the power supply. By itself this expedient might be useful for indicating purposes but for recording and control purposes the difficulty remains of controlling in a practical way as to extent and direction of rotation an A.-C. motor operating at a power-line frequency with an A.-C. control voltage at a much higher frequency. This difficulty is magnified by the necessity of stabilizing the high-speed servo system to prevent hunting.

An object of the invention is to provide in a practical way for the control of an A.-C. servomotor in accordance with the magnitude and sense of a very weak, varying D.-C. signal without interference from power-line or other extraneous voltages. This object is accomplished in accordance with the broader aspects of the invention by converting the weak D.-C. voltage to a relatively high-frequency A.-C. voltage proportional thereto in magnitude and agreeing therewith in sense, or direction, amplifying this high-frequency signal in an A.-C. amplifier, deriving from this amplified A.-C. signal and a D.-C. signal which is a greatly magnified counterpart as to measurable variations thereof of the original weak D.-C. signal, deriving from this magnified D.-C. counterpart an A.-C. voltage at the relatively low frequency at which the servomotor operates proportional in magnitude to and agreeing in directional sense with the counterpart and the original D.-C. signal, and utilizing this derived power-line-frequency signal to control the servomotor.

A further object of the invention is to provide practical recording and control apparatus of the type herein described which will be applicable generally to widely different conditions. To this end components that already have been designed and built in large quantities are employed where possible, such components being much cheaper than special, newly developed components, and they are readily replaceable in case of failure of the components or changing requirements.

Other objects and advantages of the invention will be apparent from the following more detailed description thereof with reference to the accompanying drawings, in which.

Figures 1, 2:
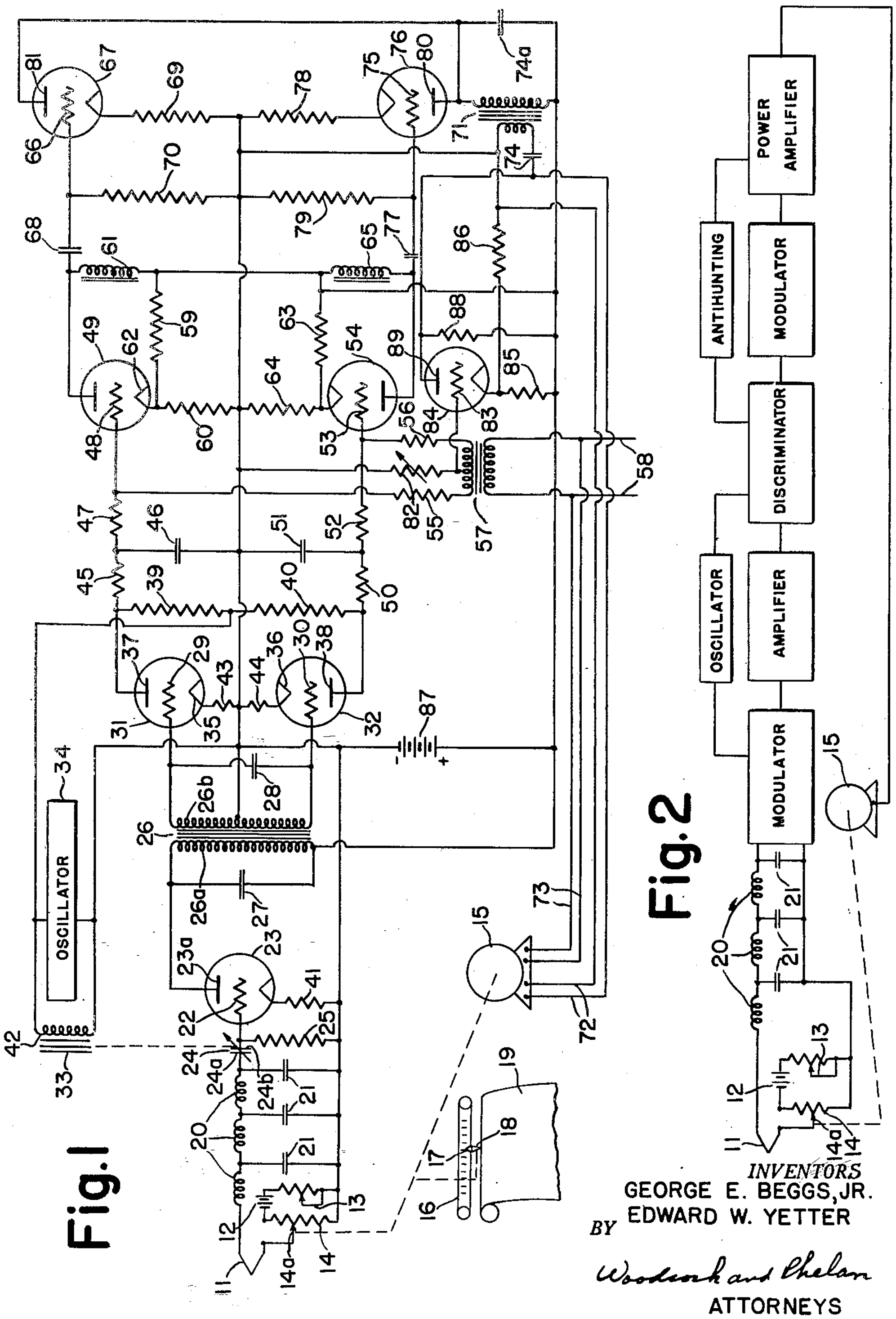
Fig. 1 is a diagrammatic representation of a recording system embodying the invention.
Fig. 2 is a single-line block diagram, partly schematic, representing functionally the system shown in Fig. 1.

Thermocouple 11 is a typical source of voltage to be measured and recorded or controlled in accordance with the invention. The thermocouple voltage may initially be balanced by a voltage from battery 12 adjustable by rheostat 13 and slide-wire 14. Thereafter if the temperature of thermocouple 11 should vary slightly the resultant D.-C. voltage may be amplified and utilized to control servomotor 15 to readjust contact 14a of slidewire 14 to rebalance the system by making the voltage of contact 14a equal and opposite to that of thermocouple 11. Thus the movement of contact 14a is a measure of the temperature of thermocouple 11 and this temperature is indicated on scale 16 by pointer 17 movable with contact 14a by motor 15. The temperature may also be recorded by pen 18 on chart 19 movable by any suitable source of power, not shown. It will be apparent that voltages from other measuring devices may be measured and similarly recorded in accordance with the invention. Because of its great sensitivity and since its input circuit offers a substantially infinite resistance to direct current, the invention is particularly suitable to receive and utilize the small voltages from glass electrodes in certain industrial operations.

The unbalance voltage, or error voltage, between thermocouple 11 and contact 14a is filtered in the filter comprising inductances 20 and capacitors 21 to remove therefrom any extraneous voltages that may be induced in the circuit preceding the filter. It will be understood that any such induced voltages necessarily will be of a varying character that may be by-passed effectively by capacitors 21 without affecting appreciably the normally slowly varying D.-C. voltage of thermocouple 11.

The filtered voltage from thermocouple 11 and slidewire 14 is applied to grid 22 of electronic tube 23 through variable capacitor 24, described more fully hereinafter. Inasmuch as capacitor 24 presents an almost infinite resistance to the D.-C. voltage from thermocouple 11 and slidewire 14 substantially all of this D.-C. voltage will be applied through grid leak 25 to charge capacitor 24. When capacitor 24 is varied at a rate of, say, 5000 cycles per second there results a 5000-cycle A.-C. voltage at grid 22 that is proportional in magnitude to the net voltage of thermocouple 11 and contact 14a, and this A.-C. voltage will agree in sense with the net D.-C. voltage, that is, the polarity of the A.-C. voltage will be determined by the direction of the net D.-C. voltage.

This 5000-cycle voltage is amplified by electronic tube 23 and transformer 26 in the plate circuit thereof. It will be apparent to those skilled in the electronic art that more amplifier stages, comprising electronic tubes and loosely coupled transformers or other forms of amplifiers, may be utilized to get any required amplification, a single amplifier stage being shown herein for clearness. It will also be understood that better relative amplification of signal and noise will be achieved if the amplifier is made selective as to the frequency it amplifies, amplifying only a narrow band of frequencies. To this end capacitor 27 tunes primary 26a of transformer 26 to 5000 cycles, for the frequency chosen by way of example, and capacitor 28 tunes secondary 26b also to 5000 cycles.

Figure 4:
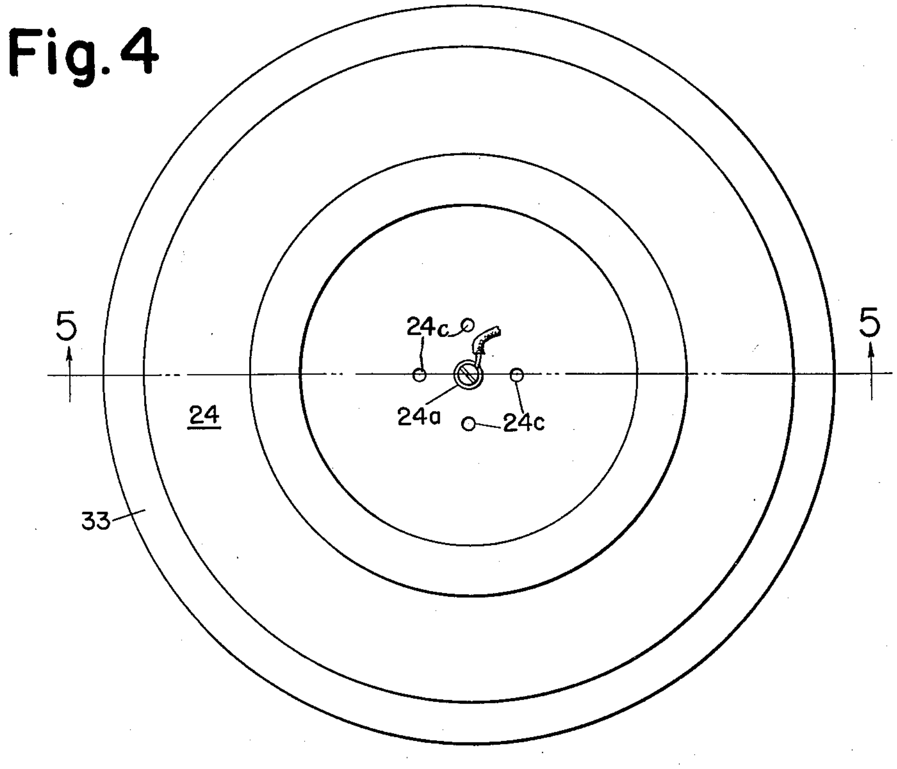
Fig. 4 is a plan view of a portion of the structure shown in Fig. 1.
Figure 5:
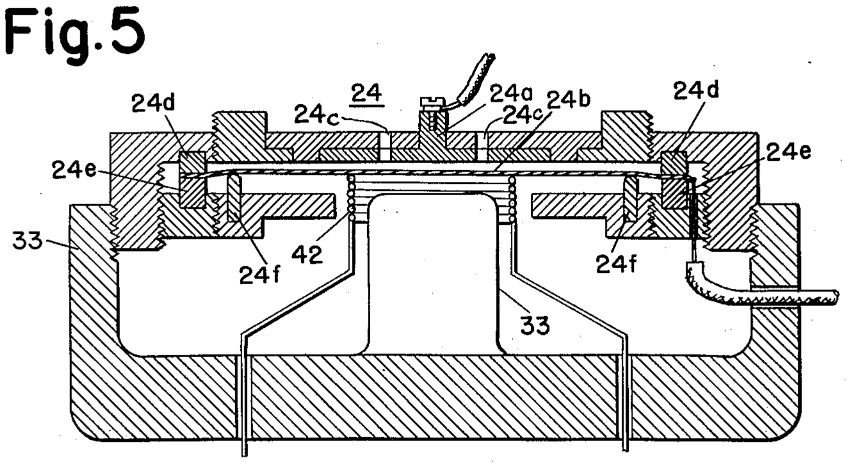
Fig. 5 is a vertical sectional view taken along the line 5—5 in Fig. 4.

The capacitance of capacitor 24, comprising plates 24a and 24b, is varied at a 5000-cycle rate by removable coil 42 connected to capacitor plate, or diaphragm, 24b moving the latter relative to plate 24a. Coil 42 is so positioned in the field of permanent magnet 33 that it will move in response to any current passing through the coil, and oscillator 34, which may be of any suitable well-known type, is connected to coil 42 to move it at the 5000-cycle rate chosen as an example. Holes 24c, Figs. 4 and 5, restrict the passage of air therethrough to provide damping for diaphragm 24b. Diaphragm 24b is firmly clamped between clamping rings 24e and 24d, Fig. 5, the diaphragm tension being adjustable by ring 24f. Coil 42 may be attached to diaphragm 24b by any suitable adhesive, not shown.

The amplified 5000-cycle voltage from transformer 26 is applied in opposite polarity to grids 29 and 30 of electronic tubes 31 and 32, respectively. A fixed voltage from the same 5000-cycle source is also applied between cathodes 35 and 36 of electronic tubes 31 and 32, respectively, and plates 37 and 38, respectively, through resistors 39 and 40, respectively. The purpose of that portion of the circuit including electronic tubes 31 and 32, which may be called a discriminator, Fig. 2, is to derive a D.-C. voltage proportional in magnitude to and agreeing in directional sense with the 5000-cycle voltage applied to grids 29 and 30. Following is a description of the operation of the system to and including the discriminator.

Suppose that, with a given temperature of thermocouple 11 resulting in a certain D.-C. voltage therefrom, contact 14a has been adjusted to a voltage equal and opposite to that of the thermocouple resulting in a zero net voltage at grid 22. It will be understood that rheostat 13 may be adjusted to cause this balance position of contact 14a to be at any desired point along slidewire 14. Now suppose that the temperature of thermocouple 11 increases slightly thereby producing a voltage to charge capacitor 24 positively. The capacitance of capacitor 24 will vary to vary this positive charge at a 5000-cycle rate which constitutes a 5000-cycle A.-C. voltage at grid 22. Now suppose further that transformer 26 is so connected that this amplified 5000-cycle voltage applied to grid 29 is in phase with the 5000-cycle voltage from oscillator 34 applied to plate 37. In other words, suppose that grid 29 is driven in a positive direction when plate 37 is also driven in a positive direction. Tube 31 will then conduct during the positive half cycles and its current will flow through resistor 39.

At the same time, with this assumed connection of transformer 26, grid 30 will be driven negative during the half cycle in which plate 38 is driven positive by oscillator 34, and tube 32 will conduct little, if any at all, during the positive half cycle of its plate voltage and little if any current will flow through resistor 40. Of course, neither tube 31 nor tube 32 will conduct at all during the negative half cycle of its plate voltage. Thus it has been shown that, with the assumed circuit connections, an increase in temperature of thermocouple 11 will result in a rectified voltage across resistor 39 but not across resistor 40.

Now suppose that, with the same circuit connections, the temperature of thermocouple 11 decreases slightly to produce a negative charge on capacitor 24. The same movement of capacitor 24 will now cause a voltage of opposite polarity (from that produced with an increase in temperature) at grid 22 or, in other words, it will produce at grid 22 an A.-C. voltage of opposite polarity which will cause grid 30 to be driven positively when plate 38 is positive to render tube 32, instead of tube 31, conductive, causing current to flow through resistor 40 instead of 39. Thus it has been shown that an increase in the temperature of thermocouple 11 will result in a voltage across one of the resistors 39 or 40 while a decrease in its temperature will result in a voltage across the other resistor. It is a matter of indifference which resistor develops a voltage in response to a given direction of temperature change since changing the voltage from one resistor to the other merely reverses the direction of rotation of motor 15 as explained hereinafter and this can be changed at will in well-known ways.

It is intended that the voltage across resistors 39 and 40, when averaged as described hereinafter, shall be an amplified counterpart of the net voltage from thermocouple 11 and slidewire 14 so that variations in voltage from thermocouple 11 will result in corresponding variations in voltage across resistors 39 and 40. This result is accomplished, insofar as sense is concerned, since a positive voltage from thermocouple 11 results in a voltage across one of resistors 39 or 40 while a negative voltage from thermocouple 11 results in a voltage across the other resistor. There is the further requirement that the magnitude of the voltage across resistors 39 and 40 be substantially proportional to the magnitude of the voltage from thermocouple 11 and therefore bias resistor 41 for tube 23 and bias resistors 43 and 44 for tubes 31 and 32, respectively, are of the proper resistance to cause these tubes to operate substantially linearly.

The voltage across resistor 39 due to the positive half cycles of the voltage from oscillator 34 is averaged by resistor 45 and capacitor 46 and applied through resistor 47 as a D.-C. voltage to grid 48 of electronic tube 49. Likewise, the voltage across resistor 40 is averaged by resistor 50 and capacitor 51 and resultant D.-C. voltage is applied through resistor 52 to grid 53 of electronic tube 54.

In order to produce a higher power-line-frequency voltage agreeing in sense with the net voltage from thermocouple 11 and slidewire 14, grids 48 and 53 are driven oppositely through resistors 55 and 56, respectively, from transformer 57 energized by power line 58 or any other suitable well-known source of power. Tube 49 is biased substantially to its plate-current cut-off condition by current flowing through bleeder resistor 59 and bias resistor 60 so that little if any 60-cycle voltage will appear across inductance 61 due to the signal on grid 48 from transformer 57 in the absence of a D.-C. signal voltage from tube 31. However, when tube 31 conducts (as it will do if the voltage from thermocouple 11 and slidewire 14 has a certain sense of direction) grid 48 becomes more positive with respect to cathode 62 of tube 49 permitting plate current to flow in the tube and producing a voltage across inductance 61 which is, in effect, the voltage applied to grid 48 from transformer 57 amplified in proportion to the D.-C. signal from tube 31. In order that this proportionality may be more exact tube 49 should be of the type commonly known as sharp cut-off tubes.

Likewise, in the absence of a signal on its grid 53 from tube 32 electronic tube 54 is biased beyond its plate-current cut-off condition by current flowing through bleeder resistor 63 and bias resistor 64. Thus in this condition no voltage is produced across inductance 65 due to the signal on grid 53 from transformer 57. However, when a D.-C. voltage of the proper direction appears from thermocouple 11 and slidewire 14, a signal through tube 32 renders grid 53 sufficiently positive so that tube 54 conducts and the voltage from transformer 57 applied to grid 53 appears in amplified form across inductance 65. Since the signals from transformer 57 applied to grids 48 and 53 are of opposite polarity, the voltages appearing across inductances 61 and 65 at different times are also of opposite polarity and the polarity of the net voltage across both inductances will be determined by the direction of the net D.-C. voltage from thermocouple 11 and slidewire 14, this net D.-C. voltage determining which inductance is supplied with voltage. Any 60-cycle voltage appearing across inductance 61 will be applied to grid 66 of electronic tube 67 through capacitor 68. Tube 67 is biased to function as an amplifier in the usual way by bias resistor 69 and grid leak 70. The output voltage from tube 67 is applied through transformer 71 to phase 72 of motor 15 which may be of the usual two-phase induction type or any other A.-C. servomotor. Phase 73 of motor 15 is energized from power line 58. Capacitor 74 produces the proper phase relation between the voltages of phase 72 and phase 73 in the usual way. Capacitor 74*a* may, if desired, be of a value to tune transformer 71 to the power frequency to reduce the effect of wave-form distortion that may be objectionable under certain conditions.

Similarly any 60-cycle voltage appearing across inductance 65 will be applied to grid 75 of electronic tube 76 through coupling capacitor 77. Tube 76 is also biased to function as an amplifier by bias resistor 78 and grid leak 79 and its output voltage is applied to phase 72 of motor 15 through transformer 71, plate 80 of tube 76 being connected to plate 81 of tube 67. Thus the 60-cycle voltage applied to phase 72 of motor 15 will have its polarity determined by the direction of the net voltage of thermocouple 11 and slidewire 14 and its magnitude will be substantially proportional to the magnitude of this net voltage. The practical result of this arrangement is that motor 15 will rotate in one direction with an increase in temperature of thermocouple 11 so that the thermocouple voltage is greater than that of the slidewire and in the opposite direction with a decrease in temperature so that the thermocouple voltage is less than that of the slidewire, this increase or decrease in temperature of thermocouple 11 being indicated by pointer 17 on scale 16 and recorded by pen 18 on the chart 19. The circuit including tubes 49 and 54 which produces a power-frequency voltage corresponding to the D.-C. output of tubes 31 and 32 may be referred to as a modulator, Fig. 2.

When motor 15 rotates in response to a small change in temperature of thermocouple 11 or in response to any other disturbance in its voltage, without adequate stabilizing, or antihunt, means it will have a tendency to travel farther than necessary to balance slidewire 14 because of its inertia and it then must reverse its direction of rotation in response to an opposite error voltage to approach the balance point of slidewire 14 from the opposite direction. As is well known this overshooting may be repeated cyclically, a phenomenon known as hunting of the recorder system. It has heretofore been suggested that such hunting might be prevented by the application to one phase of motor 15 of a D.-C. voltage whenever no operating voltage is applied to the motor. As described in Williams Patent No. 2,367,746 the application of a D.-C. voltage to one phase of a two-phase induction-type servomotor, the other phase being supplied with its usual A.-C. voltage, results in a braking action of the motor. Of course it is desired to produce such braking action only when the error voltage is zero, that is, when the motor is in its proper position and further rotation thereof is not desired. Subsequently, whenever an error voltage appears requiring the motor to rotate, it is necessary that the D.-C. voltage be removed from the motor. If hunting should occur momentarily sufficient braking action must be produced during the time intervals in which the error voltage is substantially zero to prevent sustained hunting.

As mentioned, in accordance with the invention a very small D.-C. voltage is converted to a relatively high-frequency A.-C. voltage for amplification purposes. This high-frequency A.-C. voltage is converted to a D.-C. voltage as an intermediate step in the production of the power-frequency voltage to be applied to the servomotor. Aside from its usefulness in converting a high-frequency error voltage to a power-frequency voltage this intermediate step of producing a D.-C. voltage is highly advantageous as an antihunt expedient.

Of course it is necessary that the D.-C. braking action of motor 15 be removed whenever an error voltage of either polarity occurs. To this end resistor 82 is interposed in the common return circuit for grids 48 and 53 so that a D.-C. voltage will appear across resistor 82 whenever an error voltage of either polarity appears from thermocouple 11 and slidewire 14. This voltage across resistor 82 is applied to grid 83 of electronic tube 84 which is biased substantially to its plate-current cutoff condition by bleeder resistor 85 and bias resistor 86. Whenever tube 84 is nonconducting, as it will be when there is no error voltage, voltage from battery 87 will be applied through resistor 88 to phase 72 of motor 15. When a substantial error voltage appears from thermocouple 11 and slidewire 14, producing a voltage across resistor 82, tube 84 conducts and its current through resistor 88 so reduces the voltage at plate 89 of tube 84 that a negligible D.-C. voltage is applied to phase 72 of motor 15.

It will be apparent that the magnitude of the error voltage necessary to relieve the D.-C. braking action on motor 15 may be regulated by adjusting the bias of tube 84 relative to the voltage developed across resistor 82. Thus the extent of the braking action may be adjusted, if desired, by making resistor 82, resistor 85, or resistor 86 adjustable. Battery 87 has been shown as a common B supply for tubes 23, 49, 54, 67, 76 and 84 and as a source of braking voltage. It will be understood that any suitable well-known D.-C. power source may be used instead of battery 87, if desired.

Figure 3:
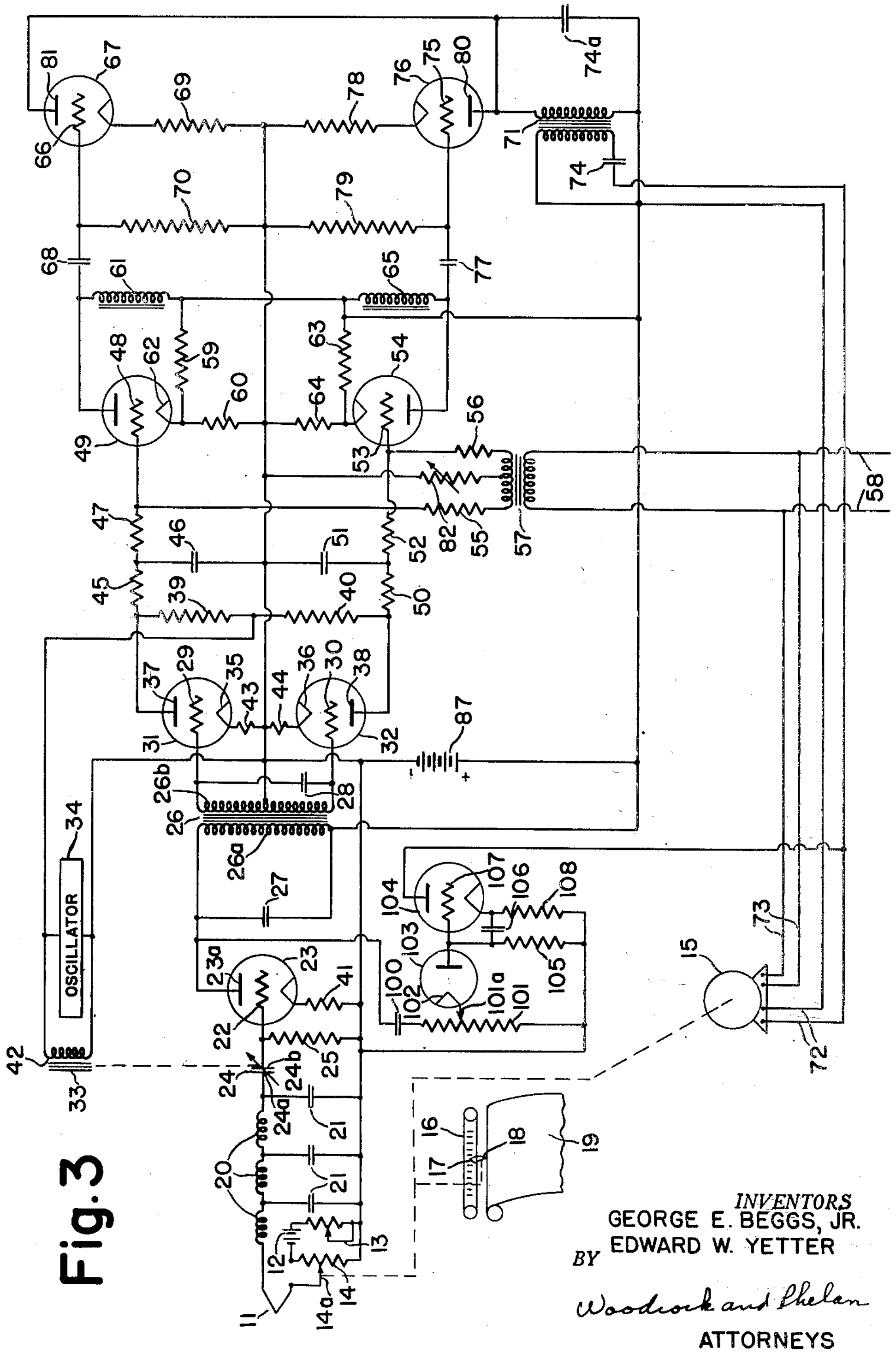
Fig. 3 is a diagrammatic representation of a modification of the structure shown in Fig. 1.

In the modification shown in Fig. 3 similar braking action of motor 15 is obtained by a D.-C. voltage produced as follows: An A.-C. voltage from plate **23*a* of tube 23 is applied through capacitor 100 to slidewire 101 the voltage of whose manually adjustable contact 101*a* is applied to cathode 102 of diode 103. Electronic tube 104 is supplied with D.-C. voltage from battery 87 through phase 72 of motor 15 so that, in its normally conducting condition with no error signals, the application of voltage from battery 87 to phase 72 brakes motor 15. When an error voltage from thermocouple 11 and slidewire 14 produces a high-frequency voltage at plate 23*a* a portion of this voltage, rectified by diode 103 and averaged into D.-C. by resistor 105 and capacitor 106, is applied to grid 107 of tube 104 and this negative voltage applied to grid 107 effectively prevents flow of current through tube 104 and relieves the braking action on motor 15**.

The following values of circuit components are preferred although they may be varied widely in various applications:

| | | |
|---|---|---|
| Battery **12** | volts | 1.5 |
| Inductances **20** | henries | 100 |
| Capacitors **21** | microfarads | 8 |
| Resistors **44** | ohms | 1,000 |
| Battery **87** | volts | 200 |
| Resistor **40** | ohms | 100,000 |
| Resistor **50** | do | 100,000 |
| Resistor **45** | do | 100,000 |
| Resistor **60** | do | 500 |
| Inductance **61** | henries | 100 |
| Inductance **65** | ohms | 500 |
| Resistor **56** | do | 250,000 |
| Capacitor **68** | microfarad | 0.1 |
| Capacitor **77** | do | 0.1 |
| Resistor **25** | megohms | 5.0 |
| Resistor **39** | ohms | 100,000 |
| Resistor **43** | do | 1,000 |
| Resistor **47** | do | 10,000 |
| Resistor **52** | do | 10,000 |
| Capacitor **46** | microfarad | 0.1 |
| Capacitor **51** | do | 0.1 |
| Resistor **69** | ohms | 300 |
| Resistor **78** | do | 300 |
| Resistor **55** | do | 250,000 |
| Resistor **82** | do | 10,000 |
| Resistor **88** | do | 5,000 |
| Resistor **86** | do | 50 |
| Resistor **85** | do | 150 |

What is claimed is:

1. In recording and controlling apparatus for positioning an A.-C. servomotor in accordance with the magnitude of a varying D.-C. signal, the combination which comprises a high-frequency oscillator, a modulator driven by said oscillator for converting said D.-C. signal to an A.-C. signal at the frequency of said oscillator, the phase and amplitude of said high-frequency signal being dependent upon the direction and magnitude of said D.-C. signal, an amplifier of relatively narrow band width for amplifying said high-frequency signal with a minimum of relative noise, a discriminator for deriving from said high-frequency signal and a voltage from said oscillator a high-voltage D.-C. signal, the direction and magnitude of which is proportional to said high-frequency signal and said D.-C. signal, and a modulator for converting said high-voltage D.-C. signal to an A.-C. signal at the power supply frequency of said motor, said last-mentioned A.-C. signal being proportional in magnitude to and agreeing in directional sense with said first-mentioned D.-C. signal, said last-mentioned A.-C. signal being applied to said motor to control the operation thereof.

2. In recording and controlling apparatus for positioning an A.-C. servomotor in accordance with the magnitude of a varying D.-C. signal, the combination which comprises a filter for said D.-C. signal to eliminate therefrom spurious variations, a high-frequency oscillator, a modulator driven by said oscillator for converting said filtered D.-C. signal to an A.-C. signal at the frequency of said oscillator and higher than that with which said servomotor is supplied, the phase and amplitude of said high-frequency signal being dependent upon the direction and magnitude of said D.-C. signal, an amplifier of relatively narrow band width for amplifying said high-frequency signal with a minimum of relative noise, a discriminator for deriving from said high-frequency signal and the voltage from said oscillator a high-voltage D.-C. signal proportional to the direction and magnitude of said high-frequency signal and said D.-C. signal, and a modulator for converting said high-voltage D.-C. signal to an A.-C. signal at the power supply frequency of said motor, said last-mentioned A.-C. signal being proportional in magnitude to and agreeing in directional sense with said first-mentioned D.-C. signal, said last-mentioned A.-C. signal being applied to said motor to control the operation thereof.

3. In recording and controlling apparatus for positioning an A.-C. servomotor in accordance with the magnitude of a varying D.-C. signal, the combination which comprises a filter for said D.-C. signal to eliminate therefrom spurious variations, a high-frequency oscillator, a modulator driven by said oscillator for converting said filtered D.-C. signal to an A.-C. signal at the oscillator frequency which is higher than the frequency of the voltage supplying said servomotor, said high-frequency signal being proportional in magnitude to and agreeing in directional sense with said D.-C. signal, an amplifier of relatively narrow band width for amplifying said high-frequency signal with a minimum of relative noise, a phase discriminator for deriving from said high-frequency signal and the oscillator voltage a high-voltage D.-C. signal proportional in magnitude to and agreeing in directional sense with said high-frequency signal and said D.-C. signal, a detector for producing a third D.-C. voltage substantially inversely proportional to said D.-C. voltage, circuit connections for applying said third D.-C. signal to a phase winding of said motor for stabilization thereof, and a modulator for converting said high-voltage D.-C. signal to an A.-C. signal at the power supply frequency of said motor, said last-mentioned A.-C. signal being proportional in magnitude to and agreeing in sense with said first-mentioned D.-C. signal, said last-mentioned A.-C. signal being applied to said motor to control the operation thereof.

4. In recording and controlling apparatus for positioning an A.-C. servomotor in accordance with the magnitude and direction of a varying D.-C. signal, the combination which comprises a modulator adapted and arranged to vary through recurring cycles of substantially constant periodicity the attenuation of said D.-C. signal in said modulator thereby converting said filtered D.-C. signal to an A.-C. signal at a frequency higher than that with which said servomotor is energized, said high-frequency signal being proportional in magnitude to and agreeing in directional sense with said D.-C. signal, an amplifier of relatively narrow frequency-band width for amplifying said high-frequency signal with a minimum of noise amplification, a discriminator comprising a plurality of electronic tubes having grid elements and plate elements, certain of said elements being driven in the same phase relation with and other of said elements being driven in phase opposition to said high frequency thereby deriving from said high-frequency signal a relatively high-voltage D.-C. signal proportional in magnitude to and agreeing in sense with said high-frequency signal and said D.-C. signal, and a modulator comprising a two-channel power-frequency amplifier having a fixed power-frequency voltage input in phase opposition in said two channels and a voltage output common to both of said channels for converting said high-voltage D.-C. signal to an A.-C. signal at the frequency of energization of said motor, the voltage gain of said two channels being controlled in their phase relation by said high-voltage D.-C. signal, said last-mentioned A.-C. signal being proportional in magnitude to and agreeing in directional sense with said first-mentioned D.-C. signal, said last-mentioned A.-C. signal being applied to said motor for controlling the operation thereof.

5. In recording and controlling apparatus for positioning an A.-C. servomotor in accordance with the magnitude and direction of a varying D.-C. signal, the combination which comprises a frequency-selective filter adapted to transmit D.-C. signals better than A.-C. signals for filtering said D.-C. signal to eliminate therefrom spurious variations, a modulator adapted and arranged to vary through recurring cycles of substantially constant periodicity the attenuation of said D.-C. signal in said modulator thereby converting said filtered D.-C. signal to an A.-C. signal at a frequency higher than that with which said servomotor is energized, said high-frequency signal being proportional in magnitude to and agreeing in directional sense with said D.-C. signal, an amplifier of relatively narrow frequency-band width for amplifying said high-frequency signal with a minimum of noise amplification a discriminator comprising a plurality of electronic tubes having grid elements and plate elements, certain of said elements being driven in the same phase relation with and other of said elements being driven in phase opposition to said high frequency thereby deriving from said high-frequency signal a relatively high-voltage D.-C. signal proportional in magnitude to and agreeing in directional sense with said high-frequency signal and said D.-C. signal, and electronic-tube inverter for producing a third D.-C. voltage substantially inversely proportional to said D.-C. voltage, circuit connections for applying said third D.-C. signal to a phase winding of said motor for stabilization thereof, and a modulator comprising a two-channel power-frequency amplifier having a fixed power-frequency voltage input in phase opposition in said two channels and a voltage output common to both of said channels for converting said high-voltage D.-C. signal to an A.-C. signal at the power-supply frequency of said motor, the voltage gain of said two channels being controlled in phase by the direction of said high-voltage D.-C. signal, said last mentioned A.-C. signal being proportional in magnitude to and agreeing in directional sense with said first-mentioned D.-C. signal, said last-mentioned A.-C. signal being applied to said motor for controlling the operation thereof.

6. In recording and controlling apparatus for positioning an A.-C., servomotor in accordance with the magnitude and direction of a varying D.-C. signal, the combination which comprises a frequency-selective filter adapted to transmit D.-C. signals better than A.-C. signals for filtering said D.-C. signal to eliminate therefrom spurious variations, a modulator adapted and arranged to vary through recurring cycles of substantially constant periodicity the attenuation of said D.-C. signal in said modulator thereby converting said filtered D.-C. signal to an A.-C. signal at a frequency higher than that with which said servomotor is energized, said high-frequency signal being proportional in magnitude to and agreeing in directional sense with said D.-C. signal, an amplifier of relatively narrow frequency-band width for amplifying said high-frequency signal with a minimum of noise amplification, a discriminator comprising a plurality of electronic tubes having grid elements and plate elements, certain of said elements being driven in the same phase relation with and other of said elements being driven in phase opposition to said high frequency thereby deriving from said high-frequency signal a relatively high-voltage D.-C. signal proportional in magnitude to and agreeing in direction with said high-frequency signal and said D.-C. signal, and a modulator comprising a two-channel power-frequency amplifier having a fixed power-frequency voltage input in phase opposition in said two channels and a voltage output common to both of said channels for converting said high-voltage D.-C. signal to an A.-C. signal at the frequency of energization of said motor, the voltage gain of said two channels being controlled in phase and amplitude by said high-voltage D.-C. signal, said last-mentioned A.-C. signal being proportional in magnitude to and agreeing in directional sense with said first-mentioned D.-C. signal, said last-mentioned A.-C. signal being applied to said motor for controlling the operation thereof.

GEORGE E. BEGGS, Jr.
EDWARD W. YETTER.

REFERENCES CITED

The following references are of record in the file of this patent:

UNITED STATES PATENTS

| Number | Name | Date |
|---|---|---|
| 2,203,689 | Macdonald | June 11, 1940 |
| 2,376,746 | Williams | Jan. 23, 1945 |
| 2,385,447 | Jones | Sept. 25, 1945 |
| 2,399,695 | Satterlee | May 7, 1946 |
| 2,414,317 | Middel | Jan. 14, 1947 |
| 2,424,568 | Isbister et al. | July 29, 1947 |
| 2,424,569 | Moseley et al. | July 29, 1947 |
| 2,438,288 | Jacobson et al. | Mar. 23, 1948 |
| 2,447,321 | Ertzmann | Aug. 17, 1948 |
| 2,476,496 | Kleiver | July 19, 1949 |
| 2,492,779 | Anderson | Dec. 27, 1949 |
| 2,529,065 | Agins | Nov. 7, 1950 |